United States Patent

[11] 3,602,593

| [72] | Inventors | Stanley J. Krulikoski, Jr.<br>Dearborn;<br>Daniel C. Kowalski, Southgate, Mich.;<br>Frank R. Whitehead, Tuscon, Ariz. |
|---|---|---|
| [21] | Appl. No. | 764,679 |
| [22] | Filed | Oct. 3, 1968 |
| [45] | Patented | Aug. 31, 1971 |
| [73] | Assignee | The Bendix Corporation |

[54] METHOD AND APPARATUS FOR ONE-DIMENSIONAL OPTICAL STEREO PARALLAX PROCESSING
16 Claims, 11 Drawing Figs.

[52] U.S. Cl. .................................................. 356/2,
350/162 SF, 356/71
[51] Int. Cl. ........................................................ G01c 11/12
[50] Field of Search ............................................ 356/2, 71;
350/3.5, 162, 162 SF

[56] References Cited
UNITED STATES PATENTS
| 3,398,269 | 8/1968 | Williams ..................... | 235/181 |
| 3,453,048 | 7/1969 | Williams ..................... | 350/162 |

OTHER REFERENCES
Cooper: The Radio and Electronic Engineer, vol. 32. no. 1 July 1966, pages 5– 13.

Thomas: Applied Optics, vol. 5, no. 11 Nov. 1966, pages 1782– 1790

*Primary Examiner*—Ronald L. Wibert
*Assistant Examiner*—F. L. Evans
*Attorneys*—William L. Anthony, Jr. and Plante, Hartz, Smith & Thompson ABSTRACT: A method and apparatus for simultaneously measuring the parallax of the imagery on two stereo photographs along a line perpendicular to the direction of parallax by taking successive one-dimensional Fourier transformations of the imagery.

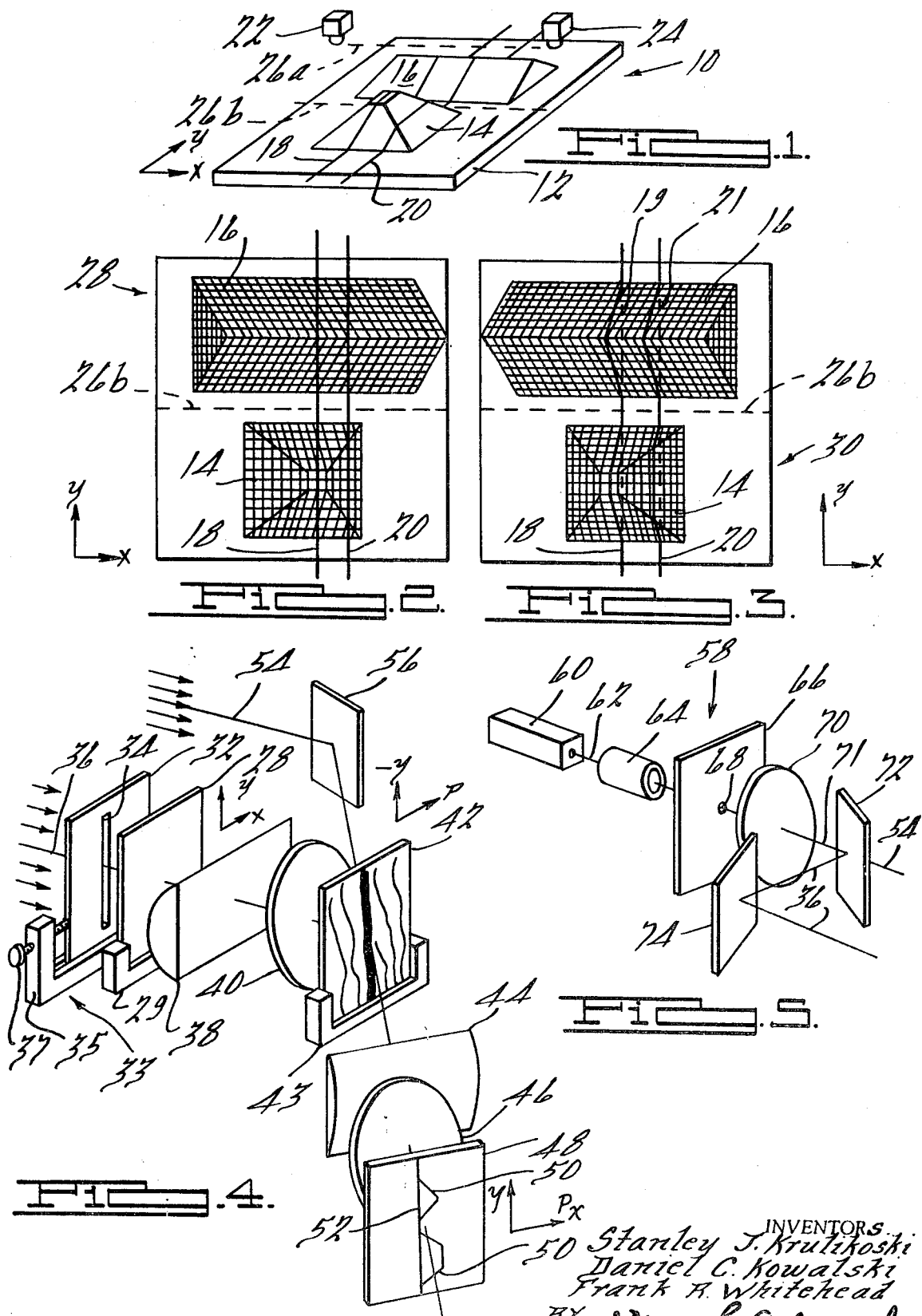

PATENTED AUG 31 1971 3,602,593

INVENTORS
Stanley J. Krulikoski
Daniel C. Kowalski
Frank R. Whitehead
BY
William L. Anthony Jr.
ATTORNEY

METHOD AND APPARATUS FOR ONE-DIMENSIONAL OPTICAL STEREO PARALLAX PROCESSING

BACKGROUND OF THE INVENTION

1. Field of the Invention

Photogrammetry, and more particularly, optical processing of stereo photographs to measure parallax.

2. Description of the Prior Art

Images appearing on a stereo part of photographs exhibit positional variations between the two photographs depending upon their relative heights or elevations. This positional variation is commonly referred to as "parallax." The meaningful parallax occurs only in a direction which is parallel to the base line of the photographs, i.e. an imaginary line drawn between the lenses of the cameras that have produced the photographs. Therefore, the relative height of a point on the object photographed can be determined by comparing the relative positional variation of its image as it appears on each photograph in a direction parallel to the base line. For example, see equations 2.49 and 2.50, pg. 49, Vol. I, 3 ed., "Manual of Photogrammetry," American Society of Photogrammetry, 1966. It thus can be understood that elevation contour maps and terrain profiles may be constructed by measuring the parallax of corresponding imagery on a pair of stereo photographs.

Various methods have been developed to automatically measure parallax. The most prevalent automatic method uses electronic scanners and electronic correlating computers to perform automatic image matching. For examples see Chapter 15, Vol. II, "Manual of Photogrammetry," American Society of Photogrammetry, 1966. Of particular interest to this invention are the optical correlation methods developed to measure parallax. The advantages of the apparatus of this invention over the prior art optical correlators will be appreciated if the functioning of these prior art optical correlators is briefly considered. The prior art optical correlators match the imagery in a small area on one photograph with the imagery in a corresponding small area on one photograph. The matching process provides a basis for determining the relative displacement of these images in a direction parallel to the base line thereby providing the information necessary to determine the mean elevation of the imagery in these small areas. It will be appreciated that the location of the small areas may be defined by two dimensions or coordinates in the plane of the photograph. Accordingly, the prior art optical correlators provide elevation measurements as a function of two-dimensions and therefore are appropriately described as two-dimensional optical correlators or two-dimensional parallax processors. If, for example, a profile of the photographed terrain were desired, a series of small areas along a predetermined line would be individually processed to yield sequential output signals representative of the profile of the terrain along the line.

One-dimensional optical correlators are also known. For example, see page 6, "A Review of Optical Data Processing Techniques," Vol. 15, Optical Acta, 1968; and pages 166–170, "Introduction to Fourier Optics," J. W. Goodman, McGraw-Hill, 1968. These correlators are used to correlate imagery along a narrow segment of a transparency. One-dimensional optical correlators have not been adapted to perform parallax processing since the one-dimensional optical correlation techniques have not heretofore been recognized by those skilled in the art as capable of providing meaningful parallax information. The fact that one-dimensional correlators have not previously been adapted for optical parallax processing may be better understood when prior art techniques are considered. The prior art techniques measured mean elevation of small areas. Satisfactory resolution was obtained with prior art systems by matching areas which were sufficiently small to minimize the possibility that large variations in elevation would go undetected. It was realized that a narrow elongated segment of a terrain photograph would typically contain imagery having a significant variation in elevation. A system which matched two such corresponding segments and obtained the mean elevation for the imagery of entire segment would not provide satisfactory resolution and accordingly would not provide meaningful data.

In summary, the prior art optical correlators computed parallax as a function of the two-dimensional location coordinates of the imagery correlated. Accordingly, the prior art systems could not simultaneously process more than one small area on a pair of stereo photographs and instantaneously produce parallax measurements for these areas.

SUMMARY OF THE INVENTION

The present invention teaches a novel adaptation of prior art one-dimensional optical correlators to provide new and useful methods and apparatus for simultaneously processing more than one small area on a stereo photograph and for instantaneously providing parallax measurements of these areas. Through the simultaneous processing of more than one area, contour lines or terrain profiles may be obtained with significantly greater speed than that which was obtainable with prior art devices.

Particularly, a plurality of simultaneous parallax measurements are taken along lines perpendicular to the base line. Since the device of the present invention optically processes the imagery along a line which is definable by a single dimension, it may be referred to as a one-dimensional optical processor. Two methods and apparatus for parallax processing of a pair of stereo photographic transparencies according to applicant's invention are disclosed herein. The two embodiments described herein match the imagery on one photograph against the imagery on the other, and visa versa. Accordingly, the processors of this invention are appropriately described as cross-correlators.

In a first embodiment, a one-dimensional Fourier transformation is taken of light transmitted through a narrow segment of one stereo transparency along a line perpendicular to the base line. The resulting light distribution is transmitted through a matched filter transparency. Particularly, the matched filter is a transparency representing the complex conjugate of the one-dimensional Fourier transform of the other stereo transparency. Finally, a third one-dimensional Fourier transformation is taken of a portion of the light transmitted through the matched filter transparency to produce a light pattern which is a line representing the parallax of imagery along the narrow segment of the first transparency. Accordingly, a parallax profile of the imagery along that line is instantaneously provided.

In a second embodiment, a narrow strip of light is modulated by transmission through the first stereo transparency along a line perpendicular to the base line. Thereafter, two successive one-dimensional Fourier transformation are taken of the modulated light. The resulting light distribution is transmitted through the second stereo transparency. A third one-dimensional Fourier transform is taken of the light distribution as modified by the second stereo transparency thereby producing an output indicative of all points along the line which are at an elevation corresponding to the relative displacement of the stereo transparencies in a direction parallel to their base lines. The relative displacement of the transparencies along their base lines may be changed to produce a new light pattern indicative of all imagery along the line having an elevation corresponding to the new relative displacement of the transparencies. Since this method provides an output representative of points of equal elevation, it is particularly useful in determining the location of contour lines.

BRIEF DESCRIPTION OF THE DRAWINGS

FIG. 1 is an illustration of a terrain model having two objects of varying elevation thereon.

FIG. 2 is a representation of a first stereo photographic transparency taken of the model of FIG. 1.

FIG. 3 is a representation of a second stereo photographic transparency taken of the model FIG. 1.

FIG. 4 is an illustration of a first embodiment of the subject invention utilizing a one-dimensional matched filter transparency of one of the stereo photographs.

FIG. 5 is an illustration of an apparatus for providing two interferring beams of light which is suitable for use in the embodiment of FIG. 4.

DETAILED DESCRIPTION OF THE PREFERRED EMBODIMENTS

Figures 6, 7:
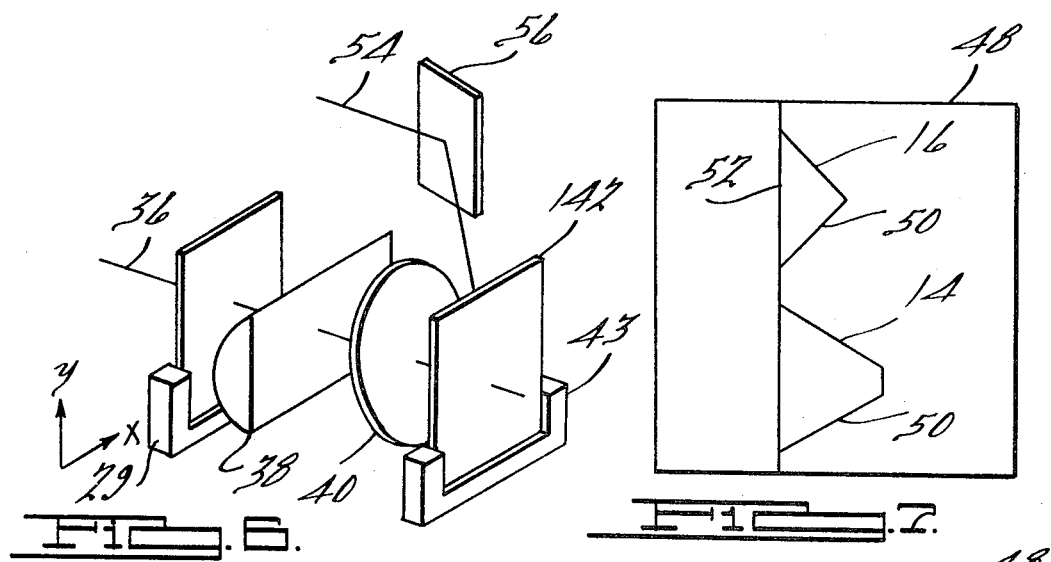
FIG. 6 is an illustration of an apparatus producing the one-dimensional matched filter transparency used in the embodiment of FIG. 4.
FIG. 7 is an illustration of the output plane of the embodiment of FIG. 4.

In FIG. 1, a model 10 is shown comprising a base 12 having a pyramidlike structure 14 and a tentlike structure 16 mounted thereon. A pair of cameras 22 and 24 are shown positioned above the model 10 with their lens intersected by an imaginary base line 26a. The imaginary base line 26a may be projected onto the upper surface of base 12 as shown in FIG. 1 as base line 26b. The concept of a "base line" is well known in the aerial stereo photogrammetric art. A pair of lines 18 and 20 are shown inscribed across the model 10 so as to be perpendicular with respect to the base line 26b. The purpose of the reference lines 18 and 20 is explained below.

In FIGS. 2 and 3, a pair of stereo transparencies 28 and 30 respectively are illustrated which are representative of photographs which would be produced by cameras 22 and 24 respectively of FIG. 1. To aid in the explanation of the present invention, $x$ and $y$ coordinates are indicated adjacent the photographs. The features of model 10 appearing in the transparencies 28 and 30 have been given like numbers to indicate corresponding structures. The transparencies are preferably perfect vertical photographs of the same scale. Perfect vertical photographs are provided by cameras positioned perpendicularly with respect to the plane of the object being photographed. For example, the cameras 22 and 24 of FIG. 1 are shown positioned perpendicularly with respect to the base 12 of the model 10 thereby providing transparencies 28 and 30 which are represented as perfect vertical photographs. Often, particularly in the case of aerial photographs, photographs are taken by cameras which are obliquely oriented with respect to the plane of the object being photographed. In these cases, the photograph may be rectified using known techniques to provide the equivalent of a perfect vertical photograph. It should be understood that the photographic transparencies 28 and 30 may be either positive or negative.

The reference lines 18 and 20 lying in the $y$ direction are also shown inscribed on transparencies 28 and 30. Referring now to transparency 28, it is apparent that the reference lines 18 and 20 are straight as if drawn with a straight edge. Since the camera 22 was not positioned directly above either reference line 18 or 20 (even though it was positioned perpendicular to the plane of base 20), it will be appreciated that the reference lines do not exactly indicate the surface outline of a vertical section of the model 10. The reference lines 18 and 20 appearing on transparency 30 are drawn over points corresponding to the locus of the reference lines 18 and 20 on transparency 28. As can be seen in FIG. 3, the reference lines 18 and 20 on transparency 30 are displaced from straight dotted lines 19 and 21. It will be appreciated by those skilled in the art that the amount of displacement, known as parallax, is a function of the elevation of the structures 14 and 16 along the respective references 18 and 20. It will also be appreciated by those skilled in the art that significant parallax exists only along lines parallel to the base line 26b, i.e. lines lying in the $x$ direction.

DESCRIPTION OF THE EMBODIMENT OF FIG. 4

In FIG. 4, a first embodiment of the present invention is shown. The apparatus of FIG. 4 measures the parallax of objects appearing on the stereographic transparencies along preselected lines which are perpendicular to the base line of the photographs, for example, lines 18 and 20. As stated above, the amount of parallax is equal to displacement between lines 18 and 20 appearing in stereographic transparency 30 and the respective straight lines 19 and 21 appearing in that same transparency which in turn is proportional to the elevation of objects along reference lines 18 and 20.

In the embodiment of FIG. 4, a blocking plate 32 having a vertical slit aperture 34 is shown positioned to receive a first beam 36 of monochromatic light 36, which as used herein, is spatially coherent. The slit 34 is preferably rectangular and has a height which is approximately the height of the transparencies 28 and 30. The width of the aperture is small relative to its height. For example, an aperture having a width of one-half millimeter and a height of 50 millimeters has proven to be satisfactory in practice. The height of the aperture 34 is limited by the size of the beam of light 36. The blocking plate 32 is mounted on an adjusting mechanism 33 comprising frame 35 and adjusting screw 37 for movement of the blocking plate 32 in the $x$ (parallax) direction.

The first photographic transparency 28 of the stereo pair is positioned to receive light passing through the aperture 34. The blocking plate 32 may be moved in the $x$ direction to bring various vertical segments of the transparency 28, for example, the segments containing the reference lines 18 or 20, into the path of the light transmitted through the aperture 34. It will be appreciated by those skilled in the art, the blocking plate 32 may be positioned on the opposite side of transparency 28.

A cylindrical lens 38 is positioned its focal length distance from the transparency 28 with its direction of curvature being along the height of the aperture 34. A spherical lens 40 is positioned to receive the light emerging from the cylindrical lens 38 at a distance therefrom which is not critical.

A one-dimensional matched filter transparency 42 of the second photographic transparency 30 is positioned to receive light from the spherical lens 40 at the back focal plane of the spherical lens 40. The method of making the one-dimensional matched filter transparency 42 is explained below in connection with FIG. 6. A second cylindrical lens 44 is positioned at an angle $\theta$ from the axis of the light beam 36 and in addition, the lens 44 is positioned at a distance equal to its focal length from the one-dimensional matched filter transparency 42. A spherical lens 46 is positioned at a noncritical distance from the cylindrical lens 44.

A plate of ground glass 48 is positioned in the back focal plane of lens 46. The ground glass provides a visual representation of the light distribution in its plane. It will be understood that the ground glass may be replaced by any suitable image producing device, for example, a photographic plate or a television camera.

A second beam 54 of monochromatic light is preferably provided. The second beam of light 54 has been provided by the same source as the first beam of light 36. An apparatus for producing this second beam of light 54 is shown in FIG. 5, the operation of which is explained below. The beam of light 54 is reflected by a mirror 56 and directed at an angle $\theta$ from the direction of the original light beam 36 towards the matched filter transparency 42. The light from beam 54, which passes through the matched filter 42, is also transmitted through the cylindrical lens 44 and the spherical lens 46 thereby arriving at the plate of ground glass 48. It should be understood that the second beam 54 is preferred to provide a reference line in the output plane 48 but is not required.

In FIG. 5, an apparatus 58 is shown for providing beams of light 54 and 36 which are capable of mutual interference. The apparatus 58 is provided with a source 60 of monochromatic light which is both temporally and spatially coherent. The source 60 is positioned to project a beam 62 onto a focusing lens system 64 which, for example, may be a microscope objective lens system. A blocking plate 66 is provided having a pinhole aperture 68 positioned coincident with the focal point of the lens system 64. A spherical collimating lens 70 is positioned at its focal length distance from the blocking plate 66 and is aligned to receive the light emerging from the pinhole aperture 68 thereby producing a collimated light beam 71. A beam splitting plate 72 is positioned to receive the collimated light beam 71 and to reflect a portion 36 of the beam 71 perpendicularly with respect to its direction and to allow the transmission of a remaining portion 54. The reflected portion 36 is in turn reflected perpendicularly by a mirror 74 towards the blocking plate 32 of FIG. 4. The transmitted portion 54 is directed toward the mirror 56 of FIG. 4. It should be understood that the apparatus 58 may be replaced by any suitable apparatus to provide beams 36 and 54 which will cause interference fringes to appear at plane 142 of FIG. 6.

DESCRIPTION OF THE ONE-DIMENSIONAL MATCHED FILTER TRANSPARENCY OF FIG. 6

The apparatus in FIG. 6 provides a one-dimensional matched filter transparency of one of the photographic transparencies, for example, transparency 30. As will be clear through inspection of FIGS. 4 and 6, the apparatus of FIG. 6 utilizes several of the components of the apparatus of FIG. 4. Accordingly, it is often convenient to use the apparatus of FIG. 4 to perform the function of the apparatus of FIG. 6. The beam 36 of monochromatic light which is both spatially and temporally coherent is projected through the stereo transparency 30. A one-dimensional Fourier transform in the parallax direction is taken of the light modulated by the photographic transparency 30 by lenses 38 and 40. A photographic plate 142 is placed in the back focal plane of lens 40 to receive the Fourier transform light distribution. The second beam 54 of light is directed towards photographic plate 142 by the mirror 56. The beams of light 36 and 54 produce interference patterns at the photographic plate 142 which will appear on the plate 142 when it is developed. In its developed state, the plate 142 has imagery thereon which represents the one-dimensional form matched filter of the photographic transparency 30 and is herein referred to as a one-dimensional matched filter transparency 42 of the second stereo transparency 30. For further information on an apparatus of this nature see page 171–176 and 178–179, "Introduction to Fourier Optics," J. W. Goodman, McGraw-Hill 1968.

OPERATION OF THE EMBODIMENT OF FIG. 4

It has been explained earlier that in the case of vertical stereo photography, parallax exists only along lines parallel to the base line 26b, i.e., lines lying in the x-direction. The imagery in the stereo transparencies 28 and 30 may generally be represented mathematically as T $(x,y)$ and $t_2(x,y)$, where $t$, and $t_2$ are the amplitude transmittances of the transparencies. The photographic bias (or average photographic density terms) are omitted for mathematical simplicity and clarity.

Since both photographs contain imagery of the same area or object, they can be considered to be very nearly alike except for the parallax shift introduced by the separation of the cameras. Therefore the two transparencies may be represented mathematically as being similar, i.e.:

$$t_1(x,y) \cong t_2(x,y) \quad (1)$$

or more precisely:

$$t_2(x,y)=t_2(x+P_x,y) \quad (2)$$

where $p_x=x$ parallax shift.

More formally, we may consider the first transparency 28 as:

$$t_1(x,y)=t_1(x-x_1,y) \quad (3)$$

and the second transparency 30 as:

$$t_2(x,y)=t_2(x-x_2,y)$$
$$=t_2[x-(x_1-P_x),y] \quad (4)$$

In the embodiment of FIG. 4, a one-dimensional matched filter transparency 42 is utilized. To construct the transparency 42 of the second photograph, the photographic plate 42 records the sum of the amplitude of the reference beam 54 and the Fourier transform of:

$$t_2(x,y)=t_2[x-(x_1-P_x)y]$$

which will be recognized as equation (4).

Let the reference beam be represented by:

$$Ke^{jbp} \quad (5)$$

and let the one-dimensional Fourier transform of the second transparency be represented by:

$$t_2[x-(x_1-P_x)y] \rightleftharpoons T_2(p,y)e^{j(x_1-P_x)p} \quad (6)$$

Since the photographic emulsion used for recording is sensitive only to intensity, not amplitude and phase, it may be considered as a square law detector. The function actually recorded may then be expressed as:

$$G(p,y) = [Ke^{jbp}+T_2(p,y)e^{j(x_1-P_x)p}]^2 \quad (8)$$
$$= |K|^2 + |T_2(p,y)|^2$$
$$+ K\overline{T_2}(p,y)e^{-j(b-x_1+P_x)p}$$
$$+ K\overline{T_2}(p,y)e^{j(b-x_1+P_x)p}$$

Referring now to FIG. 4, the beam 36 is projected toward the blocking plate 32 as indicated in FIG. 4. The slit aperture 34 of the blocking plate 32 permits only a narrow segment of the beam 36 to reach the first stereo transparency 28. Assuming now that the blocking plate 32 is positioned such that the narrow segment of beam 36 is transmitted through the portion of the transparency 28 which lies along the reference line 18, it will be appreciated that the transmitted light beam will have an intensity distribution representing the light and dark areas of the transparency 28 along the reference line 18. This also may be achieved by reversing the position of the blocking plate 32 and the transparency 28. The modulated beam is thereafter transmitted through the cylindrical lens 28 and the spherical lens 54 to produce a light intensity distribution in the back focal plane of the spherical lens 40 which represents the Fourier transform of the imagery in the x direction and an inversion of the imagery in the y direction. As a result, an inverted reconstruction of the imagery along the y axis and a one-dimensional Fourier transform of the imagery along the x axis appears in the back focal plane of the spherical lens 40 (i.e. the plane containing the one-dimensional matched filter transparency 42). Hence, a descriptive term, "a one-dimensional Fourier transform in the parallax direction," may be used.

Particularly the Fourier transform of the first paragraph is:

$$t_1(x-x_1,y) \rightleftharpoons \overline{T_1}(P,y)e^{jx_1P} \quad (9)$$

This light distribution is transmitted through the matched filter transparency thereby performing a multiplication of the matched filter with the Fourier transform of transparency 28, hence:

$$T_1(P,y)e^{jx_1P}G(P,y)$$
$$=(|K|^2 + |T_2(P,y)|^2)T_1(P,y)e^{jx_1P} \quad (10)$$
$$+ \overline{K T_2}(p,y)T_1(p,y)e^{-j(b-2x_1+P_x)p}$$
$$+ K\overline{T_2}(P,y)T_1(P,y)e^{j(b+P_x)P}$$

The only term of interest in equation 9 is the last term:

$$K\overline{T_2}(P,y)T_1(P,y)e^{j(b+P_x)P} \quad (11)$$

Since the lenses 44 and 46 take a one dimensional Fourier transforms, the output of the system is:

$$u=-(b+P_x) \quad (12)$$
$$v=y$$

Since $b$ is a constant determined by the reference beam, the system output is $P_x$ as a function of $y$, i.e., x-parallax of the two stereo photographs as a function of y photo coordinate.

In practice, this light distribution may be seen on the glass plate 48 as a line having a configuration representing the parallax of objects appearing along reference line 18 of the transparencies 28 and 30. For example, line 50 shown on the glass plate 48 in FIG. 4 and in further detail in FIG. 7 represents the parallax of objects along the reference line 18. An output reference line 52 is also illustrated on the glass plate 48 which is derived from the second beam of light 54. Even though not necessary, the reference line 52 is advantageous in measuring parallax. Particularly, the parallax of objects along reference line 18 is proportional to the distance between lines 52 and 50. This parallax, as will be understood by one skilled in the art, represents the height or elevation of objects along reference line 18 which in turn approximates a cross-sectional profile of the object 10. The parallax information may be converted into true elevation by a linear operation which is well known to those skilled in the art.

Figure 8:
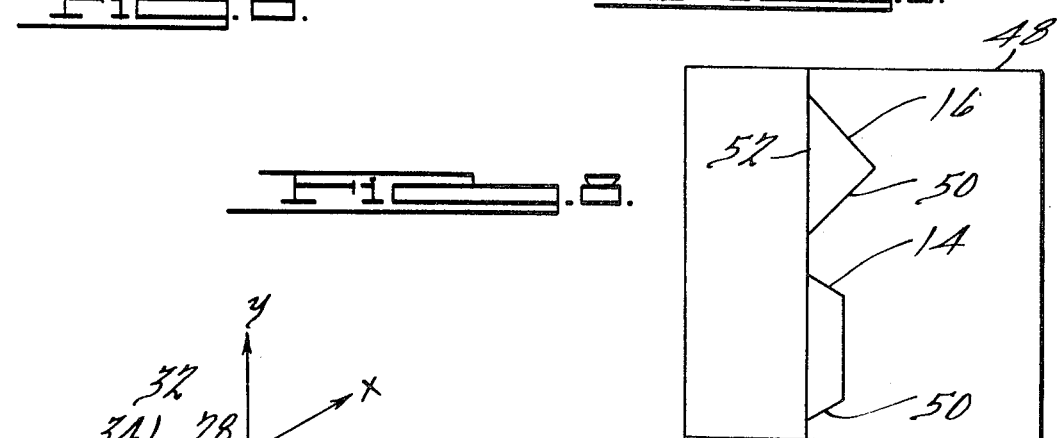
FIG. 8 is another illustration of the output plane of the embodiment of FIG. 4.

If the blocking plate 32 is moved in the x direction to align he aperture 34 with the second reference line 20, a change in the shape of line 50 will occur in accordance with the change of the parallax of objects along reference line 20. For example, the configuration of line 50 would appear as shown in FIG. 8 in which the reduced height of the pyramid 14 relative to the tent 16 can be seen.

DESCRIPTION OF THE EMBODIMENT OF FIG. 9

Figure 9:
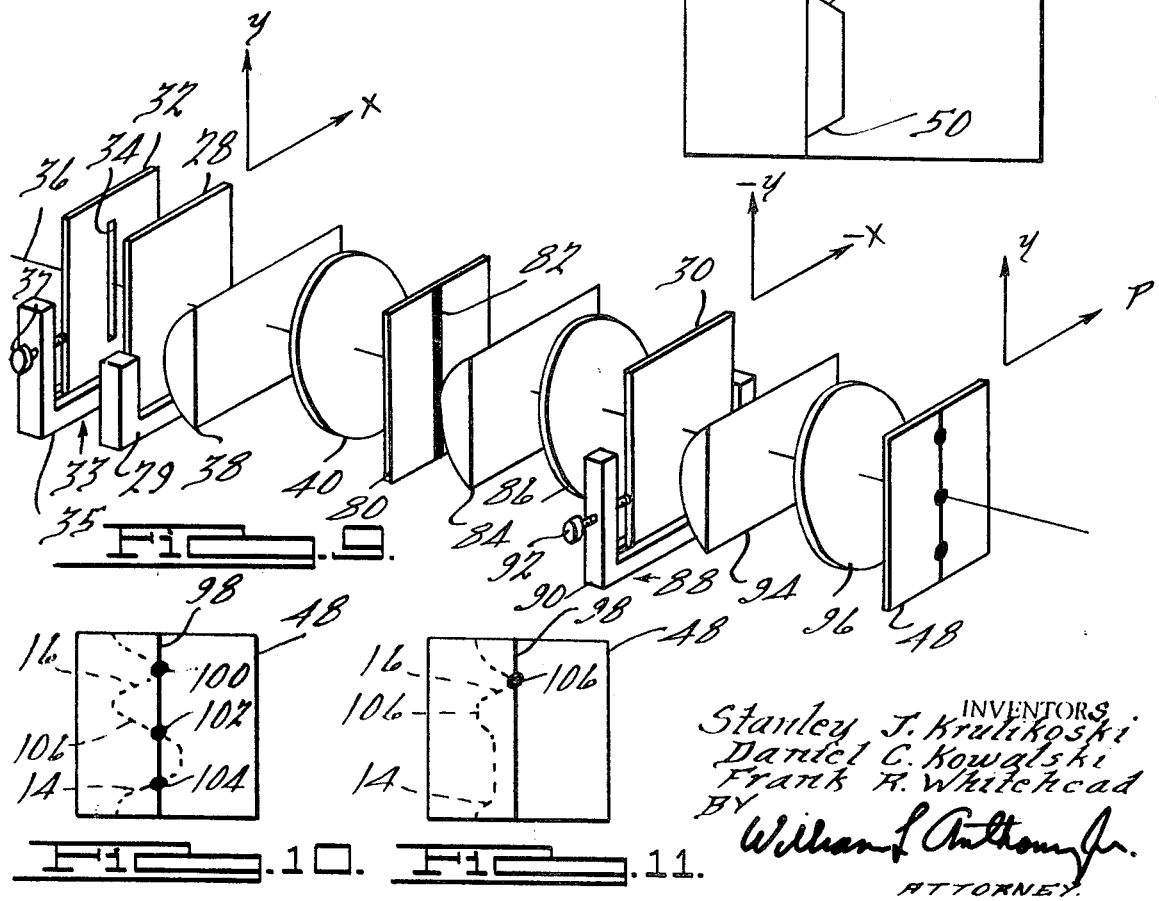
FIG. 9 is an illustration of a second embodiment of the present invention.

In FIG. 9, another embodiment of the present invention is shown. This embodiment produces an output light pattern which is indicative of all points, along a preselected line perpendicular to the base line of the transparencies, which are at equal elevation. The apparatus of FIG. 9 conveniently uses several of the components of FIG. 4. These components are numbered identically in FIGS. 4 and 9. The apparatus of FIG. 9 includes a blocking plate 32 having a vertical slit aperture 34 which is positioned to receive a first beam of monochromatic light 36 which is spatially coherent. In this embodiment, temporal coherence is not required. The blocking plate 32 is provided with an adjusting means 33 including an adjusting frame 35 and adjusting screw 37 for movement of the blocking plate 32 in the parallel direction. A cylindrical lens 38 and a spherical lens 40 are provided in combination in the same manner as described in connection with FIG. 4. A DC block 80 comprising a transparent sheet having a vertically oriented opaque center section 82 is provided at the back focal plane of lens 40. A second combination of cylindrical lens 84 and a spherical lens 86 is also provided. The cylindrical lens 84 is spaced a focal length from DC block 80. The distance between lenses 84 and 86 is not critical. The second stereo transparency 30 is mounted in an adjusting means 88 in position to receive the light distribution from the combination of lenses 84 and 86. In this embodiment, the second stereo transparency 30 is not transformed prior to its use. The adjusting means comprises a frame 90 and an adjusting screw 92 for movement of the transparency 30 in the parallax direction. A third combination of a cylindrical lens 94 and a spherical lens 96 is provided to receive the light transmitted through the second stereo transparency 30. The cylindrical lens 94 is spaced a focal length from the second transparency 30. The distance between the lenses 94 and 96 is not critical. Finally, an output plane 48 is provided to receive the light distribution from the lenses. The output plane 48 may be ground glass, a vidicon tube, or any other light sensitive device.

OPERATION OF THE EMBODIMENT OF FIG. 9

In the embodiment of FIG. 9, the beam 36 of monochromatic light is projected toward the blocking plate 32 as indicated in FIG. 4. The slit aperture 34 of the blocking plate 32 permits only a narrow vertical segment of the beam 36 to reach the first stereo transparency 28 thereby illuminating a selected narrow segment of the transparency 28, for example, the segment containing reference line 18. Accordingly, the beam 36 is modulated by the imagery along the selected segment of the transparency 28. A one-dimensional Fourier transform in the parallax direction is taken of the modulated beam by the combination of lenses 38 and 40. In view of the discussion of the embodiment of FIG. 4, it will be appreciated that the light distribution derived from the first stereo photograph 28 at the plane of the DC block 80 will be identical to the light distribution derived from that photograph at the corresponding plane of FIG. 4, the plane at which the transform transparency 42 is located. The opaque section 82 of DC block 80 eliminates the gross transmittance, or in other words, the light which does not carry a signal.

A second one-dimensional Fourier transformation in the parallax direction is taken of the modulated light distribution by the second pair of lenses 84 and 86. The resulting light distribution is projected through the second stereo transparency 30 so as to be modulated and diffracted by the imagery thereon. A third one-dimensional Fourier transform is taken by lenses 94 and 96 of the last expressed light distribution which provides an output light distribution which is projected on the output plane 48 so that it is readily visible.

Figures 10, 11:
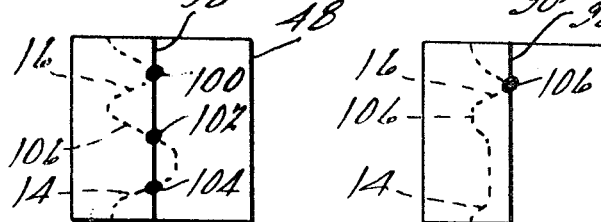
FIG. 10 is an illustration of the output plane of the embodiment of FIG. 9.
FIG. 11 is another illustration of the output plane of the embodiment of FIG. 9.

The output light signal appears on the plane 48 as a variation in intensity along a straight line 98 at P=0, as seen in FIG. 10. The points of maximum intensity indicate points of equal parallax along the selected segment, i.e. the segment containing reference line 18. The elevation of these points can be determined by measuring the offset in the parallax direction of the imagery of the two transparencies 28 and 30. Particularly, the amount of offset of the transparencies in the parallax is equal to the amount of parallax of the imagery at these points of maximum intensity.

Therefore, the amount of offset may be used to determine the elevation of points exhibiting maximum intensity. The elevation of other points along the selected segment may be determined by varying the relative displacement or offset of the transparencies in the parallax direction, for example, by adjusting of screw 92 of adjusting means 88. New points of maximum intensity will then be seen which indicate points on the imagery which are at an elevation corresponding to the new offset of the two stereo photographs 28 and 30.

Representations of typical output plane displays are shown in FIGS. 10 and 11. Referring now to FIG. 10, an output representation for reference line 18 is shown having a line of light 98 with three areas of maximum intensity 100, 102, and 104. To facilitate the teaching of this invention, a dashed outline 106 representing the profile of the terrain model 10 along reference line 18 is superimposed on the output plane 48. It should be understood that the outline 106 does not actually appear on the output plane display. It can be seen from FIG. 10 that the areas of maximum intensity 100, 102, and 104 correspond to points of equal terrain model. The elevation of these points can be determined by measuring the offset of the stereo transparencies 28 and 30. If, for example, adjustment screw 92 is turned so as to move the stereo transparency 30 in the x direction so as to establish a new offset, the points of maximum intensity would change in response thereto.

In FIG. 11, an output representation for reference line 20 is shown. The amount of offset of the photographs or parallax is equal to the amount used in conjunction with FIG. 10. Accordingly, a point of maximum intensity is similarly shown corresponding to the peak of tentlike structure 16. At reference line 20, the pyramid structure 14 is wholly below the elevation corresponding to the offset and hence correlation points for that structure do not appear.

This embodiment is particularly advantageous when used to develop contour lines. To establish a contour line for a given elevation, for example 500 feet, the offset of the transparencies in a parallax direction would be set to an amount corresponding to 500 feet of elevation. The blocking plate may then be adjusted to traverse the first stereo transparency 28, for example, by adjusting screw on adjusting frame, thereby causing points of maximum intensity on the output plane to vary in accordance with an elevation line of 500 feet.

The method and apparatus for parallax processing of stereo transparencies disclosed herein provide a significant improvement in speed of processing over prior art devices either electronic or optical. The present invention has particular utility in measuring profiles of objects which do not submit to convenient mechanical measurement. For example, the profiles of clay models of automobiles' prototypes must be painstakingly measured due to their vulnerability. The use of the present invention readily achieves accurate profile information without jeopardizing the vulnerable models. Many other advantageous uses, too numerous to list, will fall readily to mind to those skilled in the art.

Although this invention has been disclosed and illustrated with reference to a particular application, the principles involved are susceptible to numerous other applications which will be apparent to persons skilled in the art. The invention is therefore to be limited only as indicated by the scope of the appended claim:

Having thus described my invention, I claim:

1. A one-dimensional optical processor for measuring parallax on a pair of stereo transparencies comprising:

a source of monochromatic light;

means for restricting the transmission of said light to a preselected beam having a width which is substantially smaller than its height;

means relatively positioning one of said pair of stereo transparencies and said beam restricting means for transmission of said light through at least a narrow segment of said one transparency which is perpendicular to the direction of parallax, the combination of said source of light, said positioning means and said restricting means providing a beam of light having a width substantially smaller than its height which is modulated according to the imagery appearing in said narrow segment of said one transparency; and means for receiving light derived from said modulated beam for optically cross-correlating said imagery appearing in said narrow segment on said one transparency with the corresponding imagery on the other transparency of said pair to produce an output light pattern being indicative of the parallax of said imagery on said transparencies.

2. The one-dimensional optical processor of claim 1 wherein said restricting means is positioned between said source of light and said one transparency.

3. The one-dimensional optical processor of claim 1 further including utilization means for receiving said output light pattern.

4. A one-dimensional optical processor for measuring the parallax on a pair of stereo transparencies comprising:

means for providing a preselected narrow beam of monochromatic light having a width which is substantially smaller than its height;

means relatively positioning one of said pair of stereo transparencies and said beam providing means for transmission of said beam through a narrow segment of said one transparency to modulate said beam according to the imagery appearing in said narrow segment on said one transparency; and means for receiving light derived from said modulated beam for optically cross-correlating said imagery appearing in said narrow segment of said one transparency with a corresponding imagery on the other transparency of said pair to produce an output light pattern being indicative of the parallax of said imagery on said transparencies.

5. The one-dimensional optical processor of claim 4 further including utilization means for receiving said output light pattern.

6. A one-dimensional optical processor for measuring the parallax on a pair of stereo transparencies comprising:

means for providing a preselected narrow beam of monochromatic light having a width which is substantially smaller than its height;

means relatively positioning one of said pair of stereo transparencies and said beam providing means for transmission of said beam through a narrow segment of said one transparency which is perpendicular to the direction of parallax to modulate said beam according to the imagery appearing in said narrow segment of said one transparency;

first lens means for providing a first Fourier transform light distribution of said modulated light beam which is one-dimensional in parallax direction;

a one-dimensional matched filter transparency representing the complex conjugate of the one-dimensional Fourier transform of the other of said pair of stereo transparencies positioned to receive said first Fourier transform light distribution for transmission therethrough; and second lens means for providing a Fourier transform light distribution of a portion of said light transmitted through said matched filter which is one-dimensional in parallax direction to produce an output light pattern in the form of a line having a contour being indicative of the parallax of imagery appearing in said segment.

7. The one-dimensional optical processor of claim 6 further including utilization means for receiving said output light pattern.

8. The one-dimensional optical processor of claim 6 wherein said first and second lens means each comprise a spherical lens and a cylindrical lens having a direction of curvature along an axis perpendicular to the direction of parallax.

9. The one-dimensional optical processor of claim 6 wherein said first lens means includes one lens positioned to first receive said modulated light beam and another lens positioned such that the back focal plane of said another lens substantially coincides with said one-dimensional matched filter transparency.

10. A one-dimensional optical processor for measuring the parallax on a pair of stereo transparencies comprising:

means for providing a preselected narrow beam of monochromatic light having a width which is substantially smaller than its height;

means relatively positioning one of said pair of stereo transparencies and said beam providing means for transmission of said beam through a narrow segment of said one transparency which is perpendicular to the direction of parallax to modulate said beam according to the imagery appearing in said narrow segment of said one transparency;

first lens means for providing a first Fourier transform light distribution of said modulated beam which is one-dimensional in the parallax direction;

DC block means positioned to receive said first Fourier transform light distribution being aligned with said beam of light for restricting the gross transmittance of said light;

second lens means for receiving said first Fourier transform light distribution subsequent to said DC block means and for providing a second Fourier transform light distribution of said first light distribution which is one-dimensional in the parallax direction;

means positioning the other of said pair of stereo transparencies to receive said second Fourier transform light distribution for transmission therethrough to modulate said second Fourier transform light distribution according to the imagery of said other transparency, said positioning means additionally for providing a predetermined displacement of corresponding imagery of said transparencies in the parallax direction; and third lens means for providing a third Fourier transform light distribution of said light distribution modulated by said other of said pair of transparencies which is one-dimensional in the parallax direction, said third light distribution being in the form of a straight line having points of maximum intensity which represents the location of corresponding imagery on said transparencies appearing in said segment having parallax equal to said predetermined displacement.

11. The one-dimensional optical processor of claim 10 further including utilization means for receiving said output light pattern.

12. The one-dimensional optical processor of claim 10 wherein said first, second and third lens means each comprise a spherical lens and a cylindrical lens having a direction of curvature along an axis perpendicular to the direction of parallax.

13. The one-dimensional optical processor of claim 12 wherein one of said lenses of said first lens means receives said modulated light beam and the other of said lenses of said first lens means is positioned such that the back focal plane of said other lens of said first lens means substantially coincides with said DC block means.

14. The one-dimensional optical processor of claim 13 wherein one of said lenses of said second means is positioned a focal length distance from said DC block means and the other of said lenses of said second lens means is positioned such that the back focal plane of said other lens of said second lens means substantially coincides with the other of said pair of stereo transparencies.

15. The one-dimensional optical processor of claim 14 wherein one of said lenses of said third lens means is positioned a focal length from said other of said pair of stereo transparencies and said third transform light distribution appears in the back focal plane of the other of said lenses of said third lens means.

16. A method for optically displaying parallax on a pair of stereo transparencies comprising the steps of:

transmitting monochromatic light through at least a narrow segment of one of said pair of stereo transparencies which is perpendicular to the direction of parallax to provide a beam, having a width being substantially greater than its height, which is modulated according to the imagery appearing in said narrow segment of said one transparency;

optically cross-correlating the imagery appearing in said narrow segment of said one transparency with the corresponding imagery on the other transparency of said pair to produce an output light pattern being indicative of the parallax of said imagery on said transparencies; and displaying said light pattern for observation.